United States Patent
Maharana

(10) Patent No.: US 9,189,409 B2
(45) Date of Patent: Nov. 17, 2015

(54) REDUCING WRITES TO SOLID STATE DRIVE CACHE MEMORIES OF STORAGE CONTROLLERS

(71) Applicant: LSI CORPORATION, San Jose, CA (US)

(72) Inventor: Parag R. Maharana, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 157 days.

(21) Appl. No.: 13/770,379

(22) Filed: Feb. 19, 2013

(65) Prior Publication Data

US 2014/0237163 A1 Aug. 21, 2014

(51) Int. Cl.
*G06F 12/08* (2006.01)

(52) U.S. Cl.
CPC ...... *G06F 12/0871* (2013.01); *G06F 2212/222* (2013.01)

(58) Field of Classification Search
None
See application file for complete search history.

(56) References Cited

U.S. PATENT DOCUMENTS

| | | | | |
|---|---|---|---|---|
| 5,404,483 | A * | 4/1995 | Stamm et al. | 711/144 |
| 5,742,792 | A * | 4/1998 | Yanai et al. | 711/162 |
| 5,845,331 | A * | 12/1998 | Carter et al. | 711/163 |
| 5,913,222 | A * | 6/1999 | Liedtke | 711/3 |
| 6,240,527 | B1 * | 5/2001 | Schneider et al. | 714/21 |
| 6,515,916 | B2 * | 2/2003 | Takarabe | 365/189.08 |
| 7,117,306 | B2 * | 10/2006 | Rudelic | 711/118 |
| 7,136,973 | B2 * | 11/2006 | Sinclair | 711/156 |
| 7,139,863 | B1 * | 11/2006 | Defouw et al. | 711/103 |
| 7,174,421 | B2 * | 2/2007 | Ehrlich | 711/112 |
| 7,302,534 | B2 * | 11/2007 | Sinclair | 711/156 |
| 7,331,046 | B2 * | 2/2008 | Shida et al. | 717/162 |
| 7,389,393 | B1 * | 6/2008 | Karr et al. | 711/156 |
| 7,406,560 | B2 * | 7/2008 | Bulusu et al. | 711/103 |
| 7,640,388 | B2 * | 12/2009 | Nakashima et al. | 711/103 |
| 7,743,038 | B1 * | 6/2010 | Goldick | 707/694 |
| 7,836,505 | B2 * | 11/2010 | Ballard | 726/24 |
| 7,843,907 | B1 * | 11/2010 | Abou-Emara et al. | 370/386 |
| 8,209,508 | B2 | 6/2012 | Davis | |
| 8,296,534 | B1 * | 10/2012 | Gupta et al. | 711/162 |
| 2001/0030892 | A1 * | 10/2001 | Takarabe | 365/189.05 |
| 2003/0084433 | A1 * | 5/2003 | Luk et al. | 717/158 |
| 2005/0071561 | A1 * | 3/2005 | Olsen et al. | 711/118 |
| 2006/0212644 | A1 * | 9/2006 | Acton et al. | 711/103 |
| 2007/0124407 | A1 * | 5/2007 | Weber et al. | 709/212 |

(Continued)

OTHER PUBLICATIONS

Webopedia, "RAM Disk", Aug. 8, 2002, pp. 1-2, http://web.archive.org/web/20020808071514/http://www.webopedia.com/TERM/R/RAM_disk.html.*

(Continued)

*Primary Examiner* — Edward Dudek, Jr.
*Assistant Examiner* — Christopher D Birkhimer

(57) ABSTRACT

Methods and structure are provided for reducing the number of writes to a cache of a storage controller. One exemplary embodiment includes a storage controller that has a non-volatile flash cache memory, a primary memory that is distinct from the cache memory, and a memory manager. The memory manager is able to receive data for storage in the cache memory, to generate a hash key from the received data, and to compare the hash key to hash values for entries in the cache memory. The memory manager can write the received data to the cache memory if the hash key does not match one of the hash values. Also, the memory manager can modify the primary memory instead of writing to the cache if the hash key matches a hash value, in order to reduce the amount of data written to the cache memory.

20 Claims, 7 Drawing Sheets

(56) References Cited

U.S. PATENT DOCUMENTS

| | | | |
|---|---|---|---|
| 2008/0141264 A1* | 6/2008 | Johnson | 718/105 |
| 2008/0172518 A1* | 7/2008 | Shmulevich et al. | 711/103 |
| 2008/0172519 A1* | 7/2008 | Shmulevich et al. | 711/103 |
| 2008/0184001 A1* | 7/2008 | Stager | 711/167 |
| 2008/0301332 A1* | 12/2008 | Butler et al. | 710/38 |
| 2009/0249003 A1* | 10/2009 | Bates et al. | 711/162 |
| 2010/0080117 A1* | 4/2010 | Coronado et al. | 370/217 |
| 2010/0280651 A1* | 11/2010 | Edling et al. | 700/214 |
| 2010/0281208 A1* | 11/2010 | Yang | 711/103 |
| 2011/0015778 A1* | 1/2011 | Edling et al. | 700/214 |
| 2011/0087833 A1* | 4/2011 | Jones | 711/104 |
| 2011/0191522 A1* | 8/2011 | Condict et al. | 711/103 |
| 2011/0191535 A1* | 8/2011 | Yuasa | 711/113 |
| 2011/0208933 A1* | 8/2011 | Selfin et al. | 711/162 |
| 2011/0238908 A1* | 9/2011 | Kurita | 711/113 |
| 2011/0258398 A1 | 10/2011 | Saliba et al. | |
| 2011/0276744 A1* | 11/2011 | Sengupta et al. | 711/103 |
| 2011/0276780 A1* | 11/2011 | Sengupta et al. | 711/216 |
| 2011/0276781 A1* | 11/2011 | Sengupta et al. | 711/216 |
| 2012/0017041 A1* | 1/2012 | Zwisler | 711/114 |
| 2012/0017043 A1* | 1/2012 | Aizman et al. | 711/114 |
| 2012/0072684 A1* | 3/2012 | Cho et al. | 711/161 |
| 2012/0137054 A1 | 5/2012 | Sadri et al. | |
| 2012/0198139 A1 | 8/2012 | Tanaka et al. | |

OTHER PUBLICATIONS

David Geer, "Reducing the Storage Burden Via Data Deduplication", IEEE Computer Society, Industry Trends, Dec. 2008, pp. 15-17, http://ieeexplore.ieee.org/stamp/stamp.jsp?tp=&arnumber=4712493.*

* cited by examiner

FIG. 6

EXEMPLARY MAPPING DATA RECORD

| SOURCE? | BIT INDICATOR OF WHETHER THIS RECORD IS A SOURCE RECORD |
| --- | --- |
| SOURCE POINTER | POINTER TO ENTRY IN FLASH CACHE MEMORY |
| REFERENCE COUNT | NUMBER OF ALIAS RECORDS THAT POINT TO THIS RECORD |
| REMAPPED? | BIT INDICATOR OF WHETHER THE SOURCE POINTER FOR THIS RECORD HAS BEEN REMAPPED |
| REMAP POINTER | POINTER TO ENTRY IN FLASH CACHE MEMORY |
| ALIAS? | BIT INDICATOR OF WHETHER THIS RECORD IS AN ALIAS RECORD |
| ALIAS POINTER | POINTER TO ANOTHER RECORD IN MAPPING DATA |

600

… … …

REDUCING WRITES TO SOLID STATE DRIVE CACHE MEMORIES OF STORAGE CONTROLLERS

FIELD OF THE INVENTION

The invention relates generally to storage systems and more specifically relates to storage controllers that utilize Peripheral Component Interconnect Express (PCIe) Flash or Solid State Drives (SSDs) to implement their cache memories.

BACKGROUND

Storage controllers often utilize a non-volatile memory to implement a write-through or a write-back cache and thereby enhance throughput for Input/Output (I/O) operations for a host. A flash memory is an example of a type of non-volatile memory used in PCIe Flash or Solid State Drives (SSDs) to implement a cache for a storage controller. However, flash memory has a limited lifetime of total writes that they can support before failing. This is undesirable because a storage controller writes to cache memory regularly during normal operation.

SUMMARY

The present invention provides methods and structure for determining whether an incoming write to a flash cache of a storage controller includes data that already exists within the cache. If data for an incoming I/O operation already matches a cache entry, then the data for the incoming I/O operation does not have to be written to the cache.

One exemplary embodiment is a storage controller that includes a non-volatile flash memory (e.g., as a PCIe flash cache memory or a Solid State Drive (SSD) cache), a primary memory that is distinct from the cache memory, and a memory manager. The cache memory can store data for persistent storage devices that are managed by the storage controller. The memory manager is able to receive data for storage in the cache memory, to generate a hash key from the received data, and to compare the hash key to hash values for entries in the cache memory. The memory manager can write the received data to the cache memory if the hash key does not match one of the hash values. If the hash key does match a hash value, then the data is already stored in the cache. Therefore, the memory manager can modify the primary memory instead of writing to the cache in order to reduce the amount of data written to the cache memory. This extends the operational lifetime of the cache memory.

Other exemplary embodiments (e.g., methods and computer-readable media relating to the foregoing embodiments) are also described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 6 is a block diagram illustrating an exemplary mapping data record for a cache.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
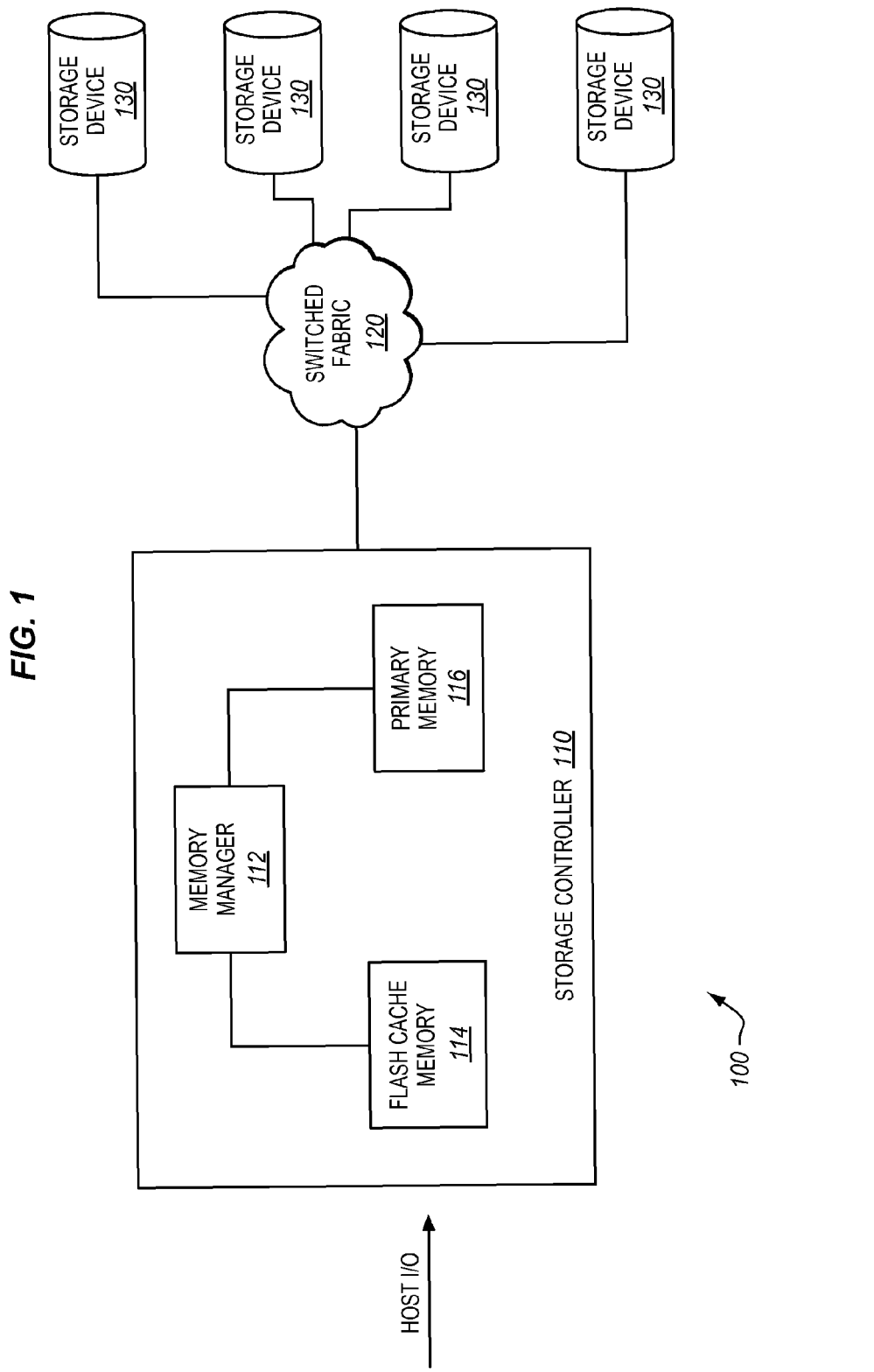
FIG. 1 is a block diagram of an exemplary storage system.

FIG. 1 is a block diagram of an exemplary storage system 100. Storage system 100 comprises storage controller 110 (e.g., a Host Bus Adapter (HBA)) that processes host I/O to communicate with one or more storage devices 130 via switched fabric 120. To enhance latency and throughput for these communications, storage controller 110 includes a cache memory 114, which is implemented with one or more PCIe flash or SSDs. However, the flash that implements cache memory 114 can only support a limited number of writes over its lifetime before eventually failing and wearing out, owing to the fundamental limitations of flash technology.

Storage controller 110 includes memory manager 112, which acquires incoming I/O and caches the I/O in flash cache memory 114 to enable faster read and/or write operations relating to storage devices 130. Memory manager 112 may translate I/O received from the host before or after storing the I/O in cache memory 114. For example, in Redundant Array of Independent Disks (RAID) systems, memory manager 112 may translate a single host I/O request into multiple RAID requests that are directed to different storage devices.

Memory manager 112 also controls a primary storage memory, memory 116 (e.g., a Random Access Memory (RAM), a battery backed-up RAM, etc.). Memory 116 is physically distinct from flash cache memory 114. Memory 116 stores mapping data that is used to correlate locations within storage system 100 (e.g., Logical Block Addresses (LBAs)) with specific entries in cache memory. For example, multiple LBAs that store the same data (e.g., the same 64 bits of data) may all be associated with the same cache entry.

While in operation, memory manager 112 can determine whether data for a newly received I/O operation is already stored in cache memory 114. In one embodiment, this is performed on an address-by-address basis. If data for an LBA is already stored in cache memory 114, memory manager 112 updates mapping data for the requested LBA to point to the appropriate location in cache memory 114, instead of filling cache memory 114 with duplicate data. By preventing a write to cache memory 114, memory manager 112 extends the operational lifetime of the one or more flash components that implement cache memory 114. Memory manager 112 may be implemented as custom circuitry, as a processor executing programmed instructions stored in an associated program memory, or some combination thereof.

I/O data stored in cache memory 114 may be received from or sent to storage devices 130 via switched fabric 120. Switched fabric 120 comprises any suitable combination of communication channels operable to forward/route communications for storage system 100, for example, according to protocols for one or more of Serial Attached Small Computer System Interface (SAS), FibreChannel, Ethernet, Internet Small Computer System Interface (ISCSI), etc. In one embodiment, switched fabric 120 comprises a combination of SAS expanders that link to one or more targets.

Storage devices 130 implement the storage capacity for storage system 100 (e.g., as one or more RAID logical volumes), and may comprise any media and/or interfaces capable of storing and/or retrieving data in a computer-readable format. For example, storage devices 130 may be magnetic hard disks, solid state drives, optical media, etc.

Note that the particular arrangement, number, and configuration of components described herein is exemplary and non-limiting. Further details of the operation of storage system 100 will be described with regard to FIG. 2. Assume, for this embodiment, that storage controller 110 actively maintains entries of data in cache memory 114 based on one or more received I/O operations. Further, assume that storage controller 110 maintains mapping data that includes hashed versions of each entry in cache memory.

Figure 2:
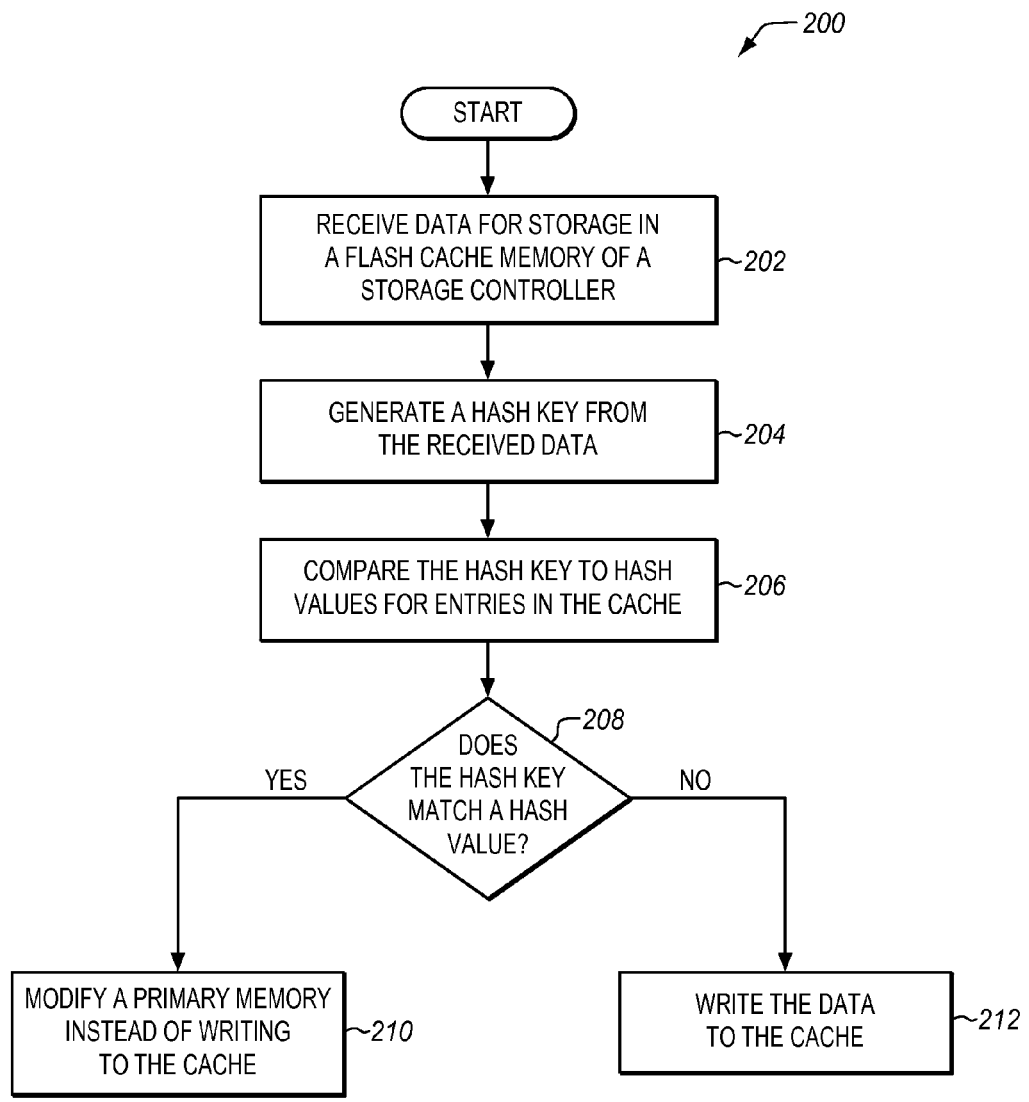
FIG. 2 is a flowchart describing an exemplary method to maintain a cache of a storage controller of a storage system.

FIG. 2 is a flowchart describing an exemplary method 200 to maintain a cache of a storage controller of a storage system. In step 202, memory manager 112 of storage controller 110 receives data that is intended for storage in flash cache memory 114. This data can be in any suitable format, such as a native host format, a RAID-specific format (e.g., a stripe of data to be written or read), etc., and the data can comprise multiple "chunks."

In step 204, memory manager 112 utilizes a hashing function to generate one or more hash keys for each chunk of the received data to be stored. The size of each chunk of received data that is hashed corresponds to the size of the cache entries. For example, if cache entries each correspond to an LBA (e.g., of 32, 64, 128 bits in size, etc.), each chunk of received data may also correspond to an LBA. In one embodiment, a perfect hashing algorithm is used that maps each unique input value to a different output value. Such hashing algorithms are sometimes referred to as cryptographic hashing algorithms.

In step 206, memory manager 112 compares a generated hash key to hash values for entries in cache memory 114, in order to check for an exact match between data from the received I/O operation and data in the cache. If a perfect hashing algorithm was used to generate the hashes, a cache entry that has a matching hash value will exactly match the received data.

In step 208, memory manager 112 determines whether the hash key matches a hash value for an entry that is already stored in cache memory 114. If the hash key does match an existing hash value, then there is no need to store the received data (or at least that chunk of received data), because the incoming data is already represented in the cache (even if the data in the cache corresponds to a different Logical Block Address (LBA)). Thus, in step 210, memory manager 112 refrains from altering flash cache memory 114. Instead, memory manager 112 updates mapping data kept in a primary physical memory (memory 116) that is distinct from cache memory 114. The updated mapping data references/points towards the cache entry that matches the received data. In this manner, whenever a request is made to retrieve the newly received data from cache memory 114, the mapping data instead directs the request towards the matching cache entry (which stores the same data, but is associated with a different LBA) reference to stored cache entry in cache memory 114.

Alternatively, if the hash key does not match any of the hash values of the cache entries, then the data from the received I/O operation is not currently stored in the cache. Therefore, memory manager 112 writes the data to cache memory 114 for storage in step 212.

Comparing hash values, instead of entire cache entries, keeps the comparison process quick and efficient to meet the demands of throughput and latency expected from storage controller 110.

In embodiments where an imperfect hashing algorithm is used, entries that have the same hash values as the received data may still be different than the received data. Therefore, in such embodiments memory manager 112 performs the additional step of comparing the received data to each cache entry that has matching hash values (e.g., by comparing each bit in the received data to each bit in the cache entry). This additional comparison can be used to quickly confirm that an exact match for the received data actually exists within cache memory 114. At the same time, because most of the comparisons to cache entries are still made using hashes (instead of on a bit-by-bit basis) cache memory 114 can still be operated at a desirable level of speed.

Even though the steps of method 200 are described with reference to storage system 100 of FIG. 1, method 200 may be performed in other systems. The steps of the flowcharts described herein are not all inclusive and may include other steps not shown. The steps described herein may also be performed in an alternative order.

Figure 3:
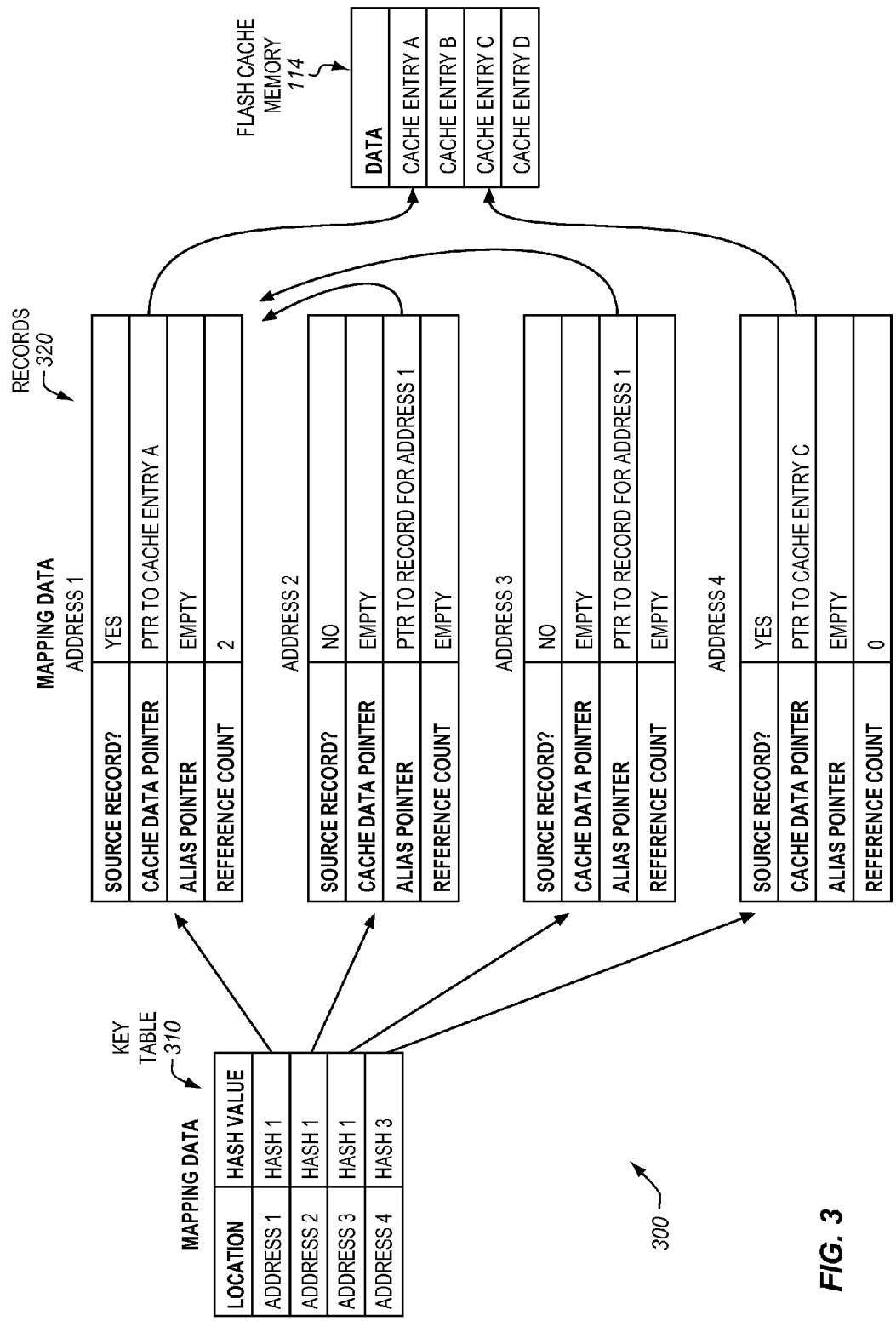
FIGS. 3-5 are block diagrams that illustrate exemplary mapping data for a cache as well as exemplary alterations to the mapping data.
Figure 4:
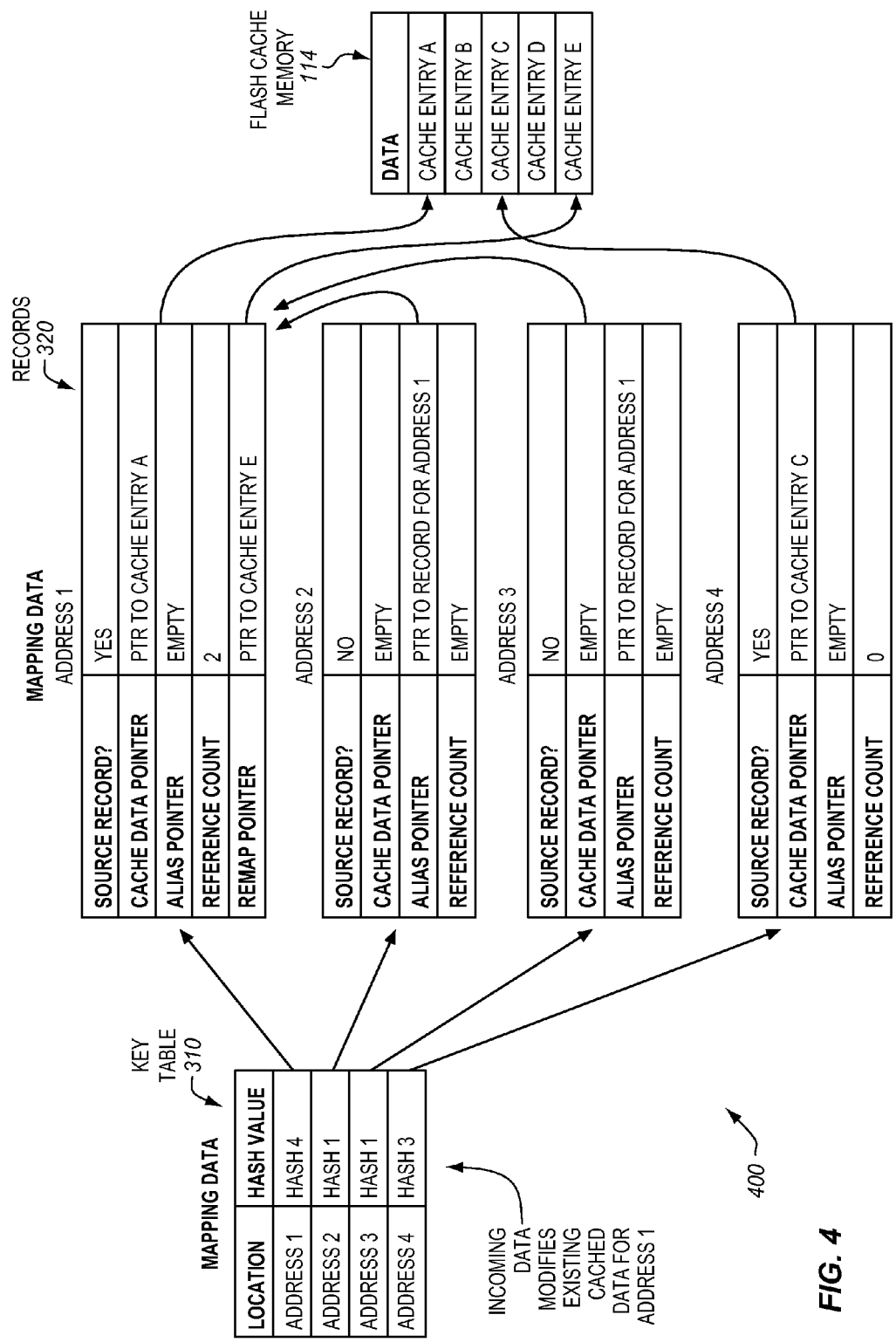
Figure 5:
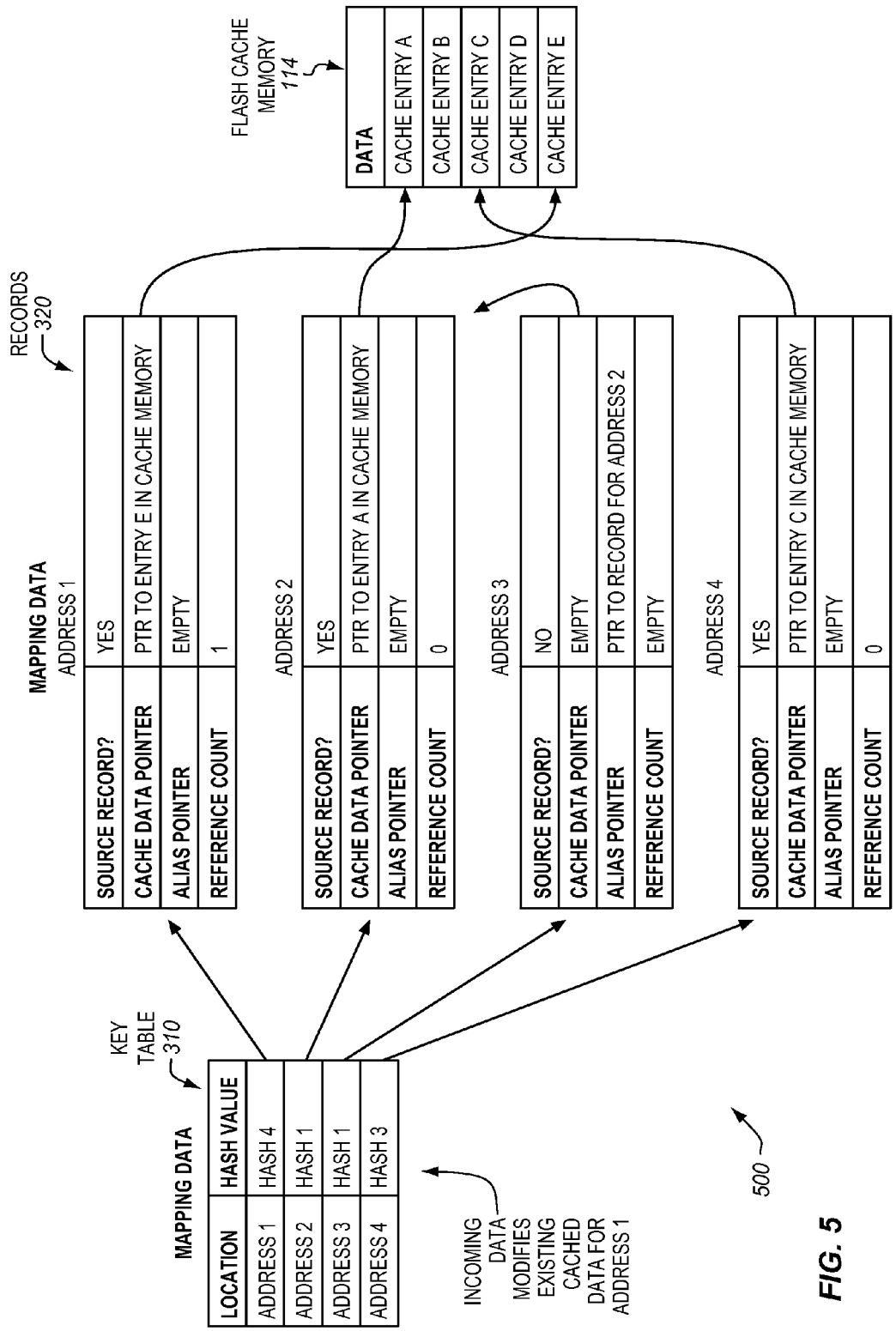

FIGS. 3-5 are block diagrams illustrating an exemplary set of mapping data for a cache as well as exemplary alterations to this mapping data. In particular, FIG. 3 is a block diagram 300 that illustrates mapping data stored on a primary physical memory 116 that is physically distinct from cache memory 114. The mapping data may also be referred to as metadata. In this embodiment, the mapping data is implemented in two discrete parts.

The first part of mapping data is key table 310. Key table 310 includes a list of Logical Block Addresses (LBAs) that are currently represented in cache memory 114. Each entry in key table 310 is associated with a specific hash value. Each hash value is a hashed version of data that is cached for a given LBA.

The second part of mapping data is a set of records 320. Each record is associated with a specific LBA, and each record includes multiple parameters. The first parameter indicates whether a given record is a "source record" or an "alias record." A source record points directly to an entry in cache memory 114. If a record is not a source record, then it is known as an alias record. Alias records point to source records, which in turn point to entries in cache memory 114. For example, in FIG. 3, the record for address 1 is a source record, so it includes a "cache data pointer" that points to a specific entry in cache memory that stores data for address 1. In contrast, the records for addresses 2 and 3 are alias records. These records in mapping data simply point to the source record for address 1. Source records also include a reference count. The reference count indicates the number of alias records that point to the source record.

When cache memory 114 is accessed during the normal course of operations (e.g., to retrieve or flush cache data for a requested LBA) memory manager 112 consults the appropriate records for the requested LBA. If the record is a source record, then the cache data pointer is immediately followed to the appropriate cache entry. In contrast, if the record is an alias record, memory manager 112 follows the alias pointer to a source record, and then follows the cache data pointer of the source record to reach the data that is actually stored in a cache entry of cache memory 114.

When incoming data is received for storing in cache memory 114, the incoming data is hashed using a perfect hashing algorithm and compared to the hash values in key table 310. If no match is found, then the data is stored in cache memory 114. Further, a new source record is created (or updated) for the LBA for the incoming data.

In contrast, if a match is found, then cache memory 114 is already storing data that is an exact duplicate of the incoming data. However, the data stored in the cache is already associated with a different LBA. Therefore, memory manager 112 creates a new record that corresponds with the LBA for the incoming data. Memory manager 112 further marks the new record as an alias record, and includes an alias pointer that refers to a source record. The source record actually points to the cache entry that stores the duplicate data. To further ensure data integrity, memory manager 112 may refrain from overwriting the data in cache entries if they are referred to by multiple records (e.g., whenever a source record for a cache entry indicates that an alias record also refers to the cache entry). Thus, in one embodiment memory manager 112 prevents writes to an entry in cache memory 114 until the reference count indicated in the corresponding source record is zero.

FIG. 4 is a block diagram 400 that illustrates alterations to the mapping data of FIG. 3 after an receiving an incoming I/O command that is intended to overwrite cached data for an LBA. Assume, for this embodiment, that incoming data is intended to modify the data stored in cache memory 114 for address 1. This creates a problem because the record for address 1 is a source record that is referred to by multiple alias records. Thus, directly modifying cache entry A (that is pointed to by the record for address 1) is inappropriate, because this will invalidate the records for addresses 2 and 3.

To address this issue, memory manager 112 modifies the record for address 1 to include a remap pointer. The remap pointer refers to a new location in cache memory (cache entry E) that stores the new data for address 1. In this manner, whenever the cache data for address 1 is retrieved, the re-map pointer is used to acquire the data instead of the cache data pointer. However, whenever cache data for addresses 2 and 3 is retrieved, an alias pointer is followed to reach the record for address 1, and the cache data pointer of this source record (and not the remap pointer) is followed to reach cache entry A.

This specific implementation is beneficial because only one pointer is modified when cache data for an LBA is modified, instead of a (potentially large) network of linked pointers. This ensures relatively good latency at storage controller 110 and low processing overhead.

FIG. 5 is a block diagram 500 that illustrates a different way of dealing with the same problem addressed in FIG. 4. In FIG. 5, incoming data will overwrite a cache entry that is referred to by a source record that is itself referred to by one or more alias records. To address this problem, the cache data pointer for the source record (here, record for address 1) is adjusted to point to a new location in cache memory that includes the new data (cache entry E). Further, one alias record in mapping data is changed to become a new source record that points to the old data (cache entry A). The other alias records that used to refer to the old source record are then altered to point to the new source record.

FIG. 6 is a block diagram illustrating a further exemplary mapping data record for a cache. In FIG. 6, each record in mapping data includes several parameters. The first parameter (SOURCE) indicates whether the record is a source record or not. The second parameter (SOURCE POINTER) is used if the record is a source record, and is a pointer to an entry in cache memory 114. The third parameter (REFERENCE COUNT) is used to indicate the number of alias records that point to the present record, if the present record is a source record. The fourth parameter (REMAPPED) is a bit that indicates whether the data for this particular record has been remapped to a new location in cache memory (e.g., in accordance with the features described above with regard to FIG. 4). The fifth parameter (REMAP POINTER) is a pointer that refers to a new entry in cache memory, if the data for the present record has been remapped. The sixth parameter (ALIAS) is a bit that indicates whether the present record is an alias record or not. If the present record is an alias record, the seventh parameter (ALIAS POINTER) is used to refer to the appropriate source record.

Figure 7:
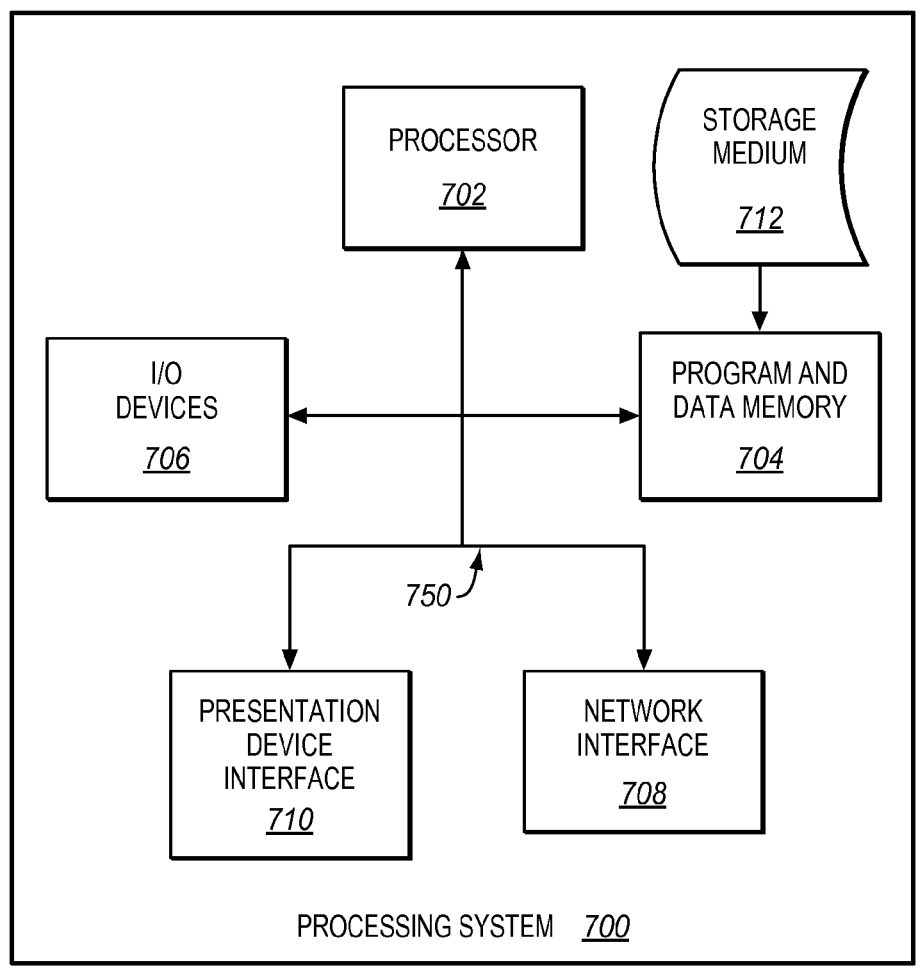
FIG. 7 illustrate an exemplary processing system operable to execute programmed instructions embodied on a computer readable medium.

Embodiments disclosed herein can take the form of software, hardware, firmware, or various combinations thereof. In one particular embodiment, software is used to direct a processing system of storage controller 110 to perform the various operations disclosed herein. FIG. 7 illustrates an exemplary processing system 700 operable to execute a computer readable medium embodying programmed instructions. Processing system 700 is operable to perform the above operations by executing programmed instructions tangibly embodied on computer readable storage medium 712. In this regard, embodiments of the invention can take the form of a computer program accessible via computer readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702.

What is claimed is:
1. A system comprising
   a storage controller that processes Input/Output (I/O) from a host to communicate with storage devices via a switched fabric, comprising:
      a non-volatile flash cache memory operable to store I/O from the host for writing to the storage devices;

a primary memory that is distinct from the cache memory; and a memory manager operation to receive data from the host or writing to at least one of the storage devices, to generate a hash key from the received data, and to compare the hash key to hash values that each correspond with a different entry in the cache memory, the memory manager further operable to write the received data to the cache memory if the hash key does not match any of the hash values, the memory manager further operable, if the hash key matched one of the hash values, to add a pointer in the primary memory that points to an entry in the cache memory corresponding with the hash value, instead of writing the received data to the cache.

2. The system of claim 1, wherein:

each of the entries corresponds with a Logical Block Address (LBA) of a logical volume implemented by the storage devices.

3. The system of claim 1, wherein:

the memory manager is further operable to determine a number of pointers in the primary memory that refer to an existing cache entry, and to prevent the modification of the existing cache entry if there are multiple pointers in the primary memory that refer to the existing cache entry.

4. The system of claim 1, wherein:

the cache memory includes an entry that stores data for an address of a logical volume, and the memory manager is further operable to receive new data that will overwrite the address, to determine that a pointer in the primary memory refers to the cache entry that stores the data that will be overwritten, to generate a new cache entry corresponding to the new data, and to modify the primary memory to include a pointer to the new entry in cache memory.

5. The system of claim 1, wherein:

the storage controller is operable to translate a single I/O from the host into multiple Redundant Array of Independent Disks (RAID) requests that are directed to different storage devices.

6. The system of claim 1, wherein:

the hash key and hash values are generated by a hashing algorithm that does not map each unique input to a different value, and the memory manager is further operable, responsive to determining that the hash key matches the hash value, to confirm that the received data matches data from the entry that corresponds with the hash value.

7. The system of claim 1, wherein:

the storage controller is operable to maintain mapping data comprising multiple records that are each associated with a Logical Block Address (LBA), wherein the storage controller tags each of the records as either a source record or an alias record, each source record pointing directly to an entry in the cache memory, and each alias record pointing to a source record, and the storage controller is operable to follow a record associated with the received data to identify an entry in the cache memory.

8. A method for operating a storage controller that processes Input/Output (I/O) from a host to communicate with storage devices via a switched fabric, comprising:

receiving, at the storage controller, data for writing to at least one of the storage devices;

generating a hash key at the storage controller from the received data;

comparing, at the storage controller, the hash key to hash values that each correspond with a different entry in a non-volatile flash cache memory of the storage controller;

if the hash key does not match any of the hash values, writing the received data to the cache memory; and if the hash key matches one of the hash values, adding a pointer in a primary memory of the storage controller that is distinct from the cache memory, wherein the pointer points to an entry in the cache memory corresponding with the hash value.

9. The method of claim 8, wherein:

each of the entries corresponds with a Logical Block Address (LBA) of a logical volume implemented by the storage devices.

10. The method of claim 8, further comprising:

determining a number of pointers in the primary memory that refer to an existing cache entry; and preventing the modification of the existing cache entry if there are multiple pointers in the primary memory that refer to the existing cache entry.

11. The method of claim 8, wherein:

the cache memory includes an entry that stores data for an address of a logical volume, and the method further comprises:

receiving new data that will overwrite the address;

determining that a pointer in the primary memory refers to the cache entry that stores the data that will be overwritten;

generating a new cache entry corresponding to the new data; and modifying the primary memory to include a pointer to the new entry in cache memory.

12. The method of claim 8, further comprising:

translating, at the storage controller, a single I/O from the host into multiple Redundant Array of Independent Disks (RAID) requests that are directed to different storage devices.

13. The method of claim 8, wherein:

the hash key and hash values are generated by a hashing algorithm that does not map each unique input to a different value, and the method further comprises:

confirming, responsive to determining that the hash key matches the hash value, that the received data matches data from the entry that corresponds with the hash value.

14. The method of claim 8, further comprising:

maintaining mapping data comprising multiple records that are each associated with a Logical Block Address (LBA);

tagging each of the records as either a source record or an alias record, each source record pointing directly to an entry in the cache memory, and each alias record pointing to a source record; and following a record associated with the received data to identify an entry in the cache memory.

15. A non-transitory computer readable medium embodying programmed instructions which, when executed by a processor, are operable for performing a method of operating a storage controller that processes Input/Output (I/O) from a host to communicate with storage devices via a switched fabric, the method comprising:

receiving, at the storage controller, data for writing to at least one of the storage devices;

generating a hash key at the storage controller from the received data;

comparing, at the storage controller, the hash key to hash values that each correspond with a different entry in a non-volatile flash cache memory of the storage controller;

if the hash key does not match any of the hash values, writing the received data to the cache memory; and if the hash key matches one of the hash values, adding a pointer in a primary memory of the storage controller that is distinct from the cache memory, wherein the pointer points to an entry in the cache memory corresponding with the hash value.

16. The medium of claim 15, wherein:
each of the entries corresponds with a Logical Block Address (LBA) of a logical volume implemented by the storage devices.

17. The medium of claim 15, the method further comprising:
determining a number of pointers in the primary memory that refer to an existing cache entry; and
preventing the modification of the existing cache entry if there are multiple pointers in the primary memory that refer to the existing cache entry.

18. The medium of claim 15, wherein:
the cache memory includes an entry that stores data for an address of a logical volume, and the method further comprises:
receiving new data that will overwrite the address;
determining that a pointer in the primary memory refers to the cache entry that stores the data that will be overwritten;
generating a new cache entry corresponding to the new data; and
modifying the primary memory to include a pointer to the new entry in cache memory.

19. The method of claim 15, the method further comprising:
translating, at the storage controller, a single I/O from the host into multiple Redundant Array of Independent Disks (RAID) requests that are directed to different storage devices.

20. The medium of claim 15, wherein:
the hash key and hash values are generated by a hashing algorithm that does not map each unique input to a different value, and the method further comprises:
confirming, responsive to determining that the hash key matches the hash value, that the received data matches data from the entry that corresponds with the hash value.

* * * * *